United States Patent [19]
Dhurjaty et al.

[11] Patent Number: 6,031,583
[45] Date of Patent: Feb. 29, 2000

[54] HIGH FREQUENCY VIDEO ISOLATION SYSTEM

[75] Inventors: Sreeram Dhurjaty; Martin E. Trzcinski, both of Rochester, N.Y.

[73] Assignee: Eastman Kodak Company, Rochester, N.Y.

[21] Appl. No.: 09/093,997

[22] Filed: Jun. 9, 1998

[51] Int. Cl.[7] ...................................... H04N 5/40
[52] U.S. Cl. .......................... 348/724; 455/207; 375/258; 375/220; 333/218
[58] Field of Search ..................................... 375/220, 258; 348/724, 723; 455/207, 208, 209, 234.1, 314; 333/12, 24, 218

[56] References Cited

U.S. PATENT DOCUMENTS

| | | | |
|---|---|---|---|
| 4,300,164 | 11/1981 | Sacks | 358/163 |
| 4,398,133 | 8/1983 | Beaumont et al. | 315/411 |
| 4,931,867 | 6/1990 | Kikuchi | 358/98 |
| 5,517,159 | 5/1996 | Hwang | 332/127 |
| 5,574,749 | 11/1996 | Nelson et al. | 375/220 |
| 5,838,719 | 11/1998 | Moore, III | 375/206 |

*Primary Examiner*—Andrew I. Faile
*Assistant Examiner*—Habte Bahgi

[57] ABSTRACT

A high frequency video isolation circuit comprising: a modulating signal source for producing a modulating signal having a frequency of several hundred megahertz; an input multiplier for multiplying the modulating signal with an input video signal having frequency components in a frequency range from about several hertz to about one hundred or more megahertz, to produce a modulated video signal having frequency components in a frequency range from about one hundred megahertz to about several hundred megahertz; a first isolation transformer having an input and an output, for transforming the modulated video signal from the input to the output; and an output multiplier for multiplying the transformed modulated video signal with the modulating signal to produce an isolated output video signal having the frequency components of the input video signal.

4 Claims, 5 Drawing Sheets

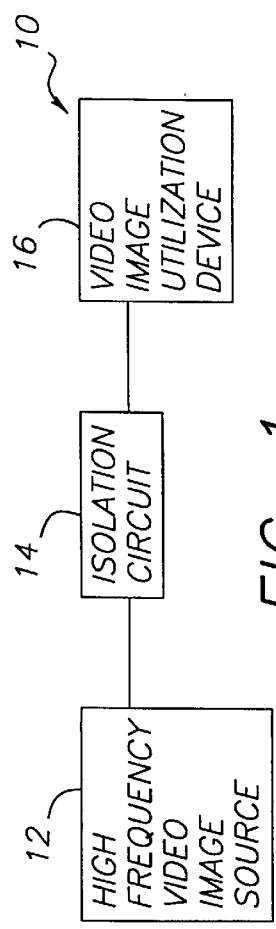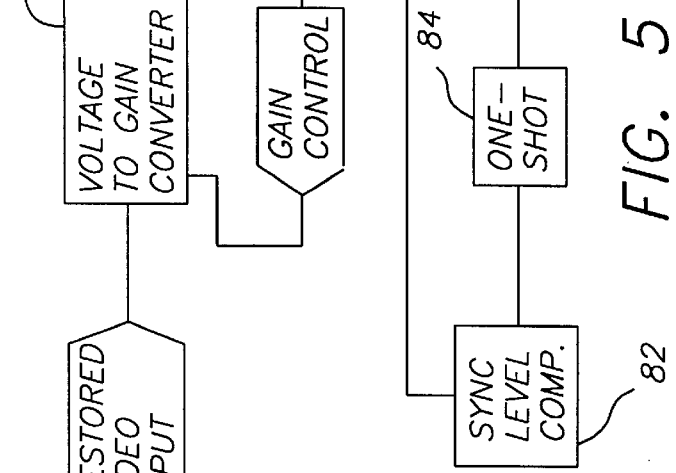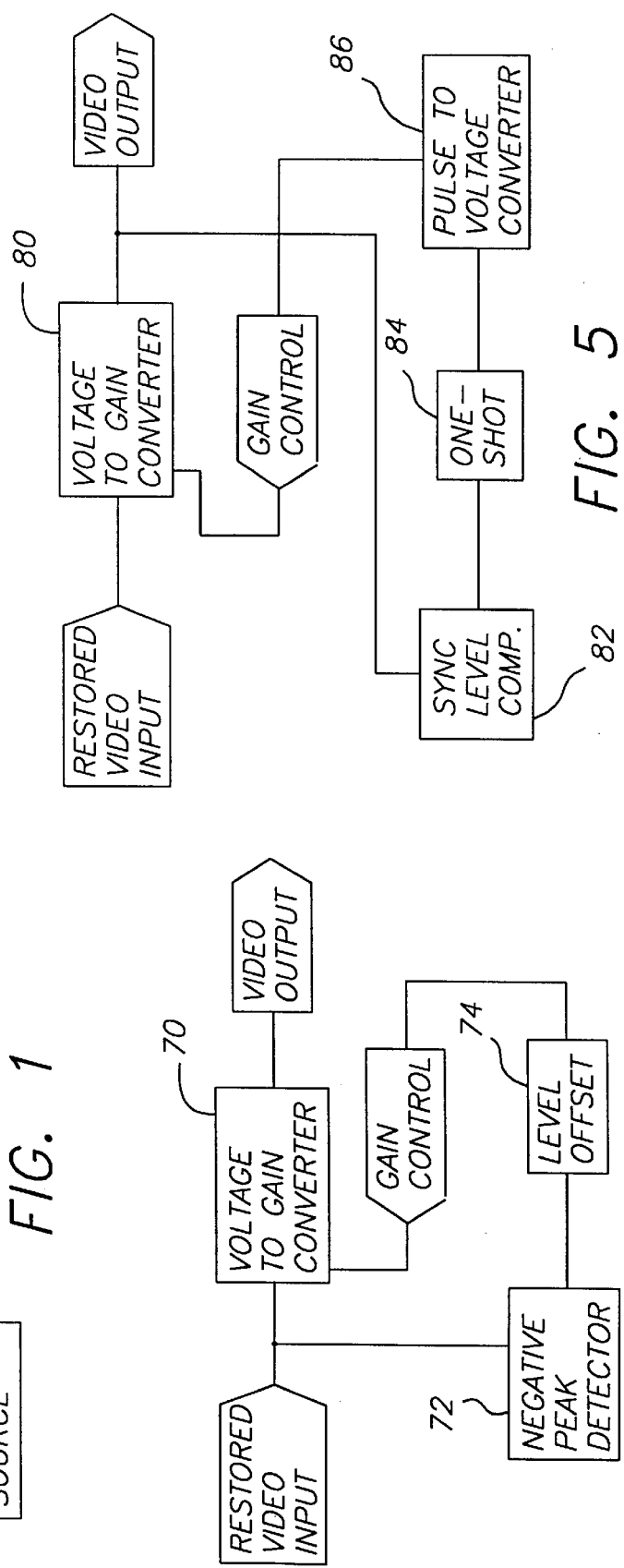

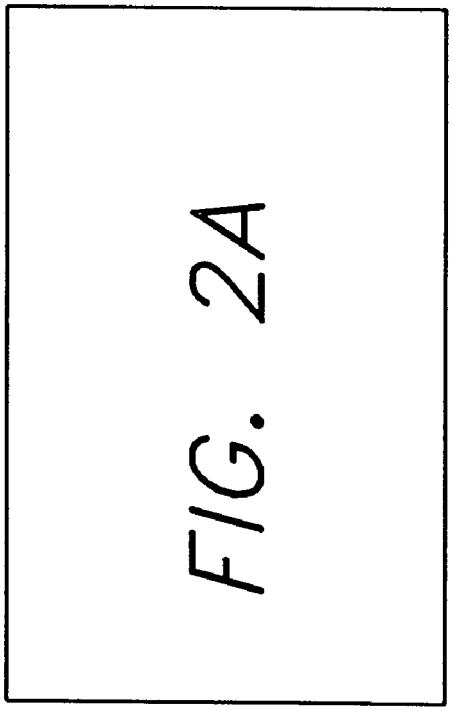
FIG. 2A
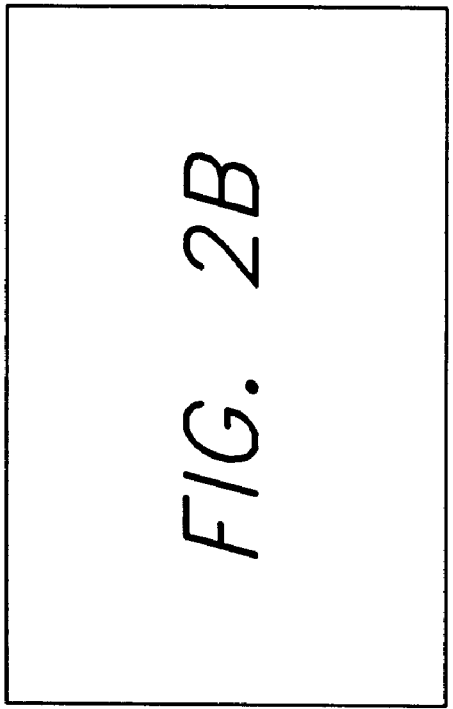
FIG. 2B
FIG. 2

HIGH FREQUENCY VIDEO ISOLATION SYSTEM

FIELD OF THE INVENTION

This invention relates in general to video imaging systems and relates more particularly to, an isolation system for high frequency video systems such as medical imaging systems.

BACKGROUND OF THE INVENTION

Video systems, such as medical diagnostic imaging systems (CT, MRI, PET, US) generate high frequency signals which may have frequency components ranging from 30 HZ (Hertz) to 150 Mhz (Megahertz). It is necessary in many instances, to isolate such signals from other devices which use these signals, for purposes of personnel (patient) safety. Recent regulatory requirements have placed a demand on achieving such isolation in a form that is backward compatible with existing systems such as printers and workstations.

Conventional opto-isolators are limited in their frequency response and cannot be used. Digitization of the high frequency video signal and then isolating the digital portion optically, is expensive, especially if the digitized signal has to reconverted to an analog signal for purposes of backward compatibility. Direct transformer isolation of these signals is not feasible because the bandwidth requirements dictated by such signals would require both a high and a low frequency response from the transformer.

U.S. Pat. No. 5,574,749, issued Nov. 12, 1996, inventors Nelson et al., discloses a technique for isolating data terminal equipment from a transmission line. The technique uses balanced mixers and isolating capacitors to handle 10 Mhz signals. There is no disclosure that the technique can be used to isolate high frequency signals having a frequency of several hundred Mhz or that high frequency transformers can be used instead of the lower frequency capacitors.

SUMMARY OF THE INVENTION

According to the present invention there is provided a solution to the problems discussed above.

According to a feature of the present invention there is provided a high frequency video isolation circuit comprising: a modulating signal source for producing a modulating signal having a frequency of several megahertz; an input multiplier for multiplying the modulating signal with an input video signal having frequency components in a frequency range from about several hertz to about one hundred or more megahertz, to produce a modulated video signal having frequency components in a frequency range from about one hundred megahertz to about several hundred megahertz; an isolation transformer having an input and an output, for transforming the modulated video signal from the input to the output; and an output multiplier for multiplying the transformed modulated video signal with the modulating signal to produce an isolated output video signal having the frequency components of the input video signal.

BRIEF DESCRIPTION OF THE DRAWINGS

FIG. 1 is a block diagram of a high frequency video imaging system incorporating the present invention.

FIG. 2 is a block diagram of an embodiment of the present invention.

FIG. 4 is a block diagram of a negative peak controlled automatic gain control circuit.

FIG. 5 is a block diagram of a closed loop automatic gain control circuit.

DETAILED DESCRIPTION OF THE INVENTION

Referring now to FIG. 1, there is shown a high frequency video imaging system incorporating the present invention. As shown, system 10 includes a high frequency video mage source 12, an isolation circuit 14, and a video image utilization device 16. Source 12 can be any video source, such as a medical imaging modality which generates high frequency video signal which can have frequency components ranging from 30 Hz (Hertz) to 150 Mhz (Megahertz). Isolation circuit 14 isolates the high frequency video signals of source 12 from device 16. Device 16 can, for example, be a display device, a hard copy printer, a video image storage device, and a video image processor.

Figure 2A:
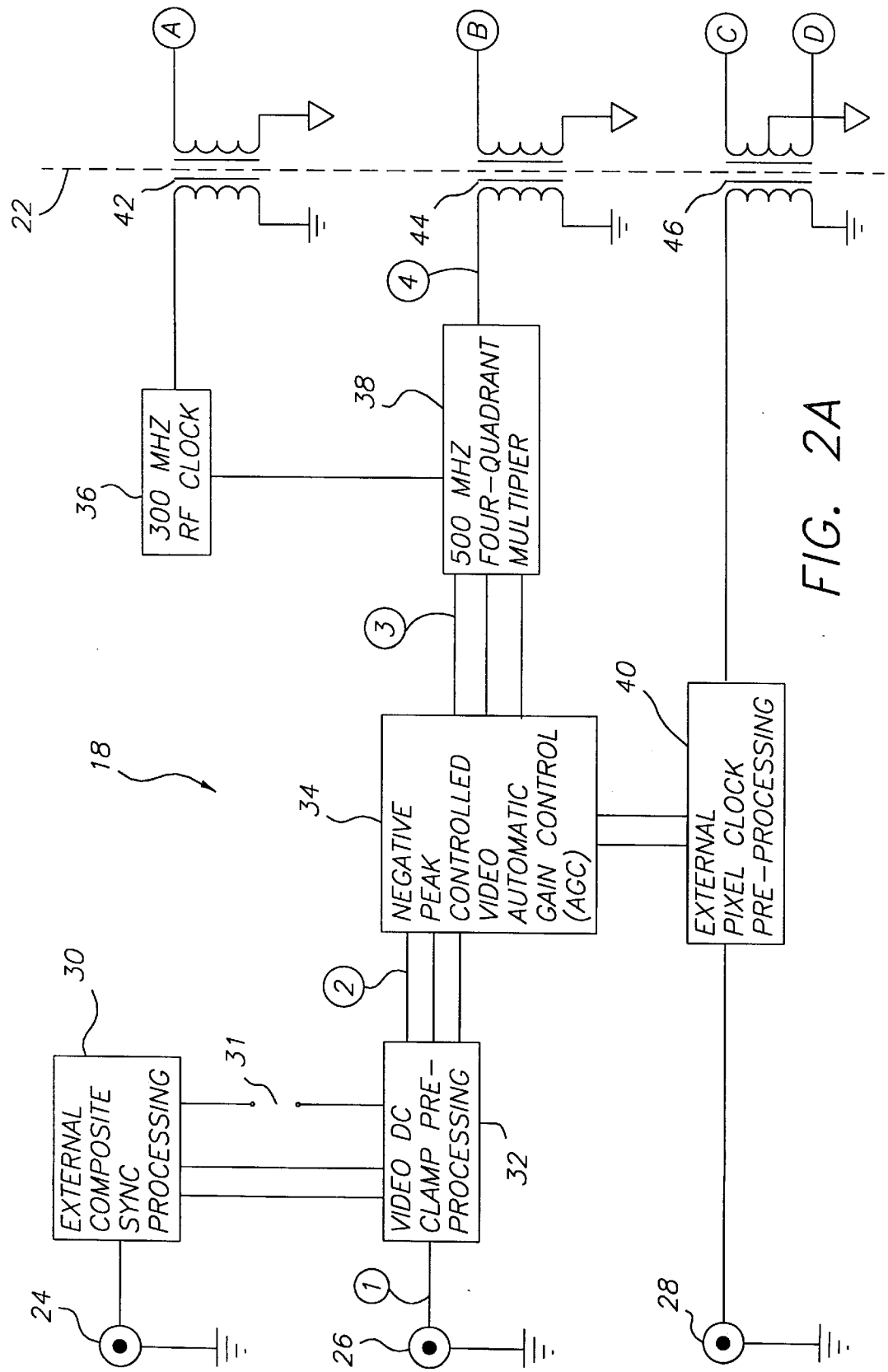
FIGS. 2A and 2B are a block diagrams of an embodiment of the present invention.
Figure 2B:
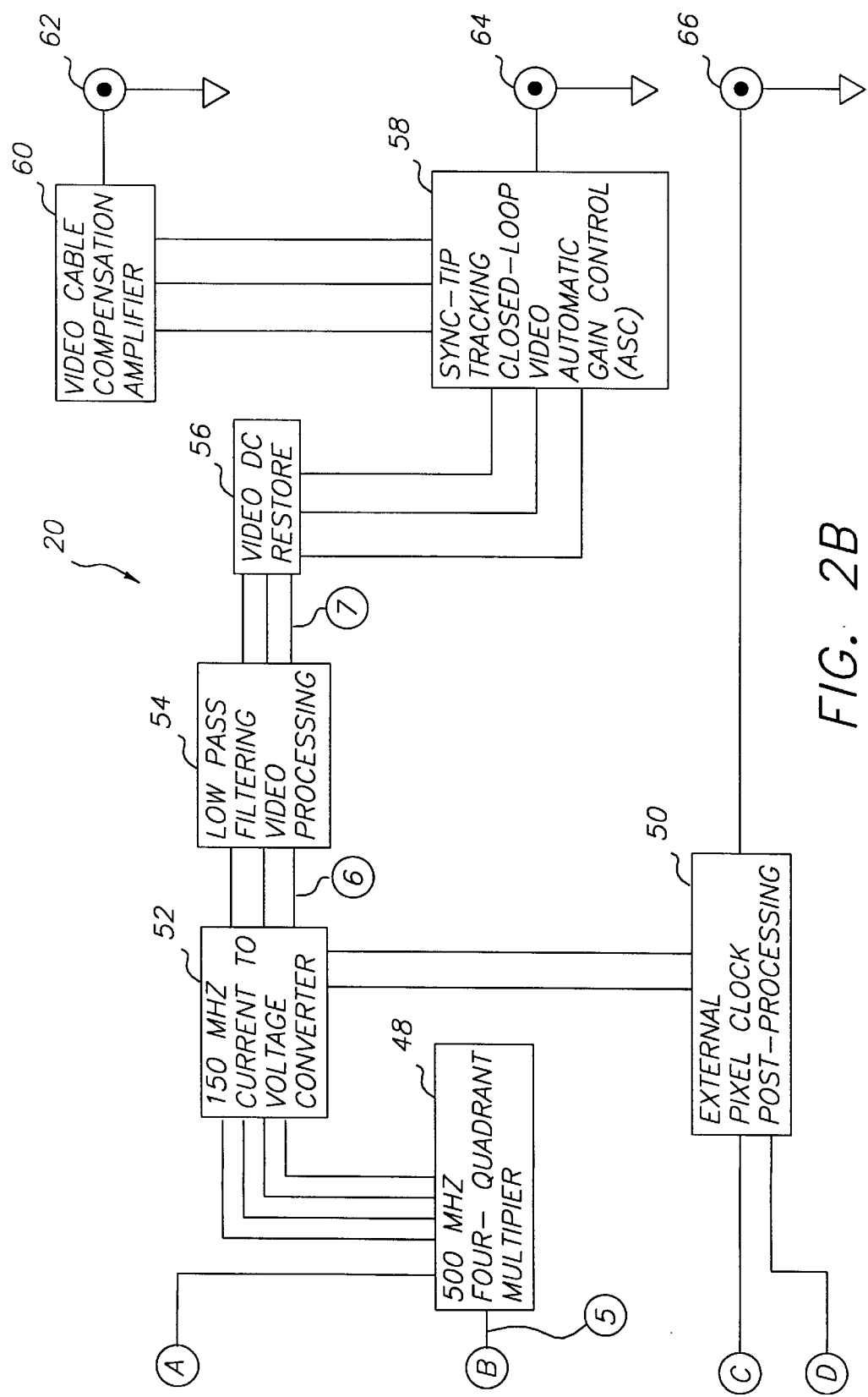

An embodiment of isolation circuit 14 is shown in FIGS. 2A and 2B. Circuit 14 includes an input section 18, an output section 20, and an isolation section 22. Input section 18 includes input 24 for receiving isolated composite sync, input 26 for receiving isolated video, input 28 for receiving isolated external pixel clock, external composite sync processing circuit 30, external sync enable 31, video DC clamp preprocessing circuit 32, negative peak controlled video automatic gain control circuit 34, 300 Mhz RF clock circuit 36, 500 Mhz multiplier circuit 38, and external pixel clock preprocessing circuit 40. Isolation section 22 includes isolation RF transformers 42, 44, and 46. Output section 20 includes 500 Mhz multiplier circuit 48, external pixel clock post processing circuit 50, 150 Mhz current-to-voltage converter 52, low pass filtering and processing circuit 54, video DC restore circuit 56, sync tip tracking closed loop video automatic gain control circuit 58, video cable compensation amplifier 60, outputs 62, 64, and 66.

In practice, video signals are generated with different amplitudes and frequency components. Certain devices such as radiographic hardcopy printers demand precision in the amplitudes and frequencies of the signals applied to their inputs. Furthermore, an isolation scheme should not introduce objectionable additional to the video. Capacitors and RF transformation can introduce relative phase shifts that may cause attenuation. The invention shown in FIG. 2 handles these issues in a new and nonobvious manner.

Figure 3:
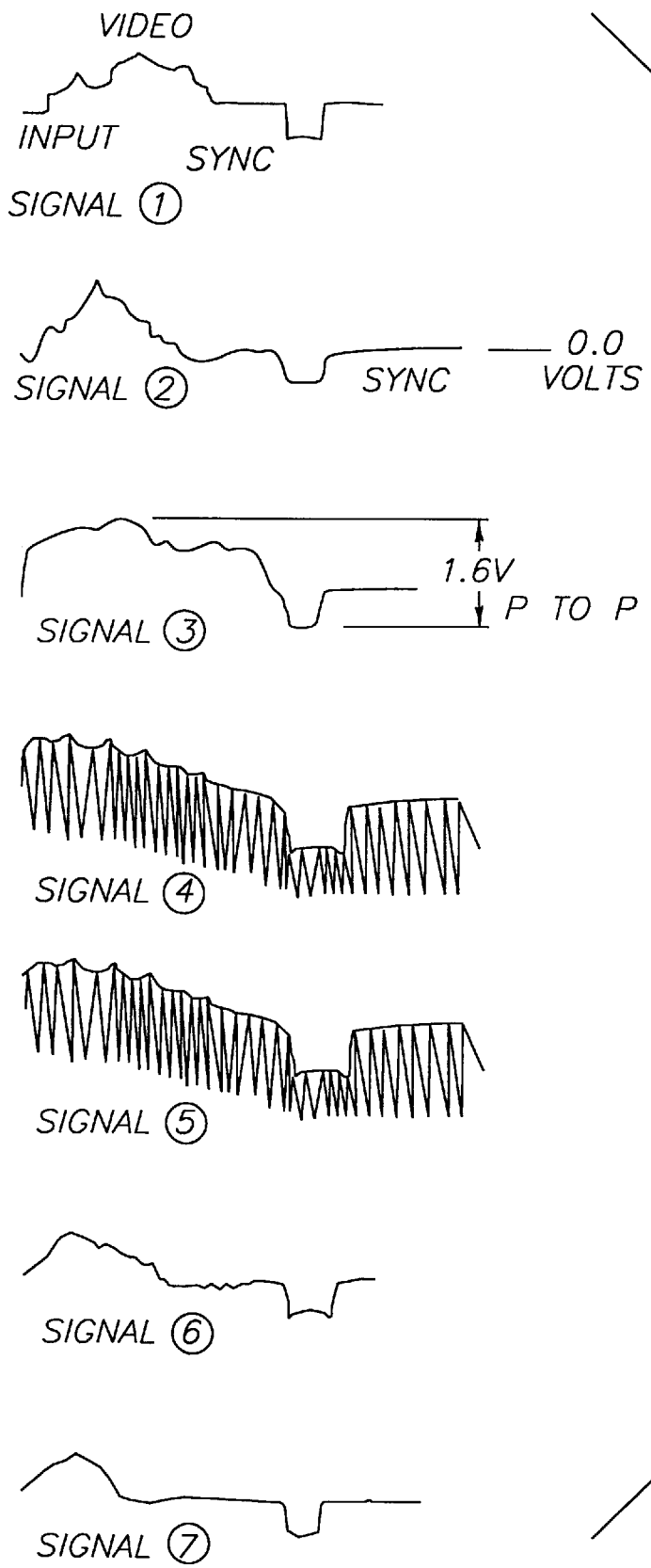
FIG. 3 is a series of signal diagrams useful in explaining the present invention.

The operation of isolation circuit will now be described with reference to FIGS. 2A, 2B and 3. The video from a medical imaging modality received at input 16 (FIG. 3, signal 1) is passed through a DC restoration stage 32 which insures that the video portion of the signal starts at a ground reference voltage, with the sync signal going from ground to a negaive voltage (FIG. 3, signal 2). It is recognized that the amplitude of this signal (signal 2) is a reliable indication of the magnification of the video signal. This is a better indication than monitoring the video field which may have random values. The signal is automatically gain controlled by negative peak detection in circuit 34 (FIG. 3, signal 3). Thus the multiplier 38 sees as large a signal as possible. This is important in order to achieve optimum signal to noise ratios, irrespective of the amplitude of the video signal emanating from the high frequency video source. In order to maintain simplicity and speed, automatic gain control circuit 34 is an open loop system.

Because the input video signal can have frequency components ranging from 30 Hz to 150 Mhz, multiplier 38 multiplies the input signal by a 300 Mhz modulating signal produced by clock circuit 36 to produce a modulated signal (FIG. 3, signal 4) which contains sideboards that range from 150 Mhz to 450 Mhz. The modulated signal (FIG. 3, signal 4) from multiplier 38 is transformed to output section 20 (FIG. 3, signal 5) by isolating transformer 44. The modulating signal from circuit 36 is transformed to section 20 by isolating transformer 42.

The transformed signal is multiplied with the modulated signal by multiplier 48 and converted to a voltage signal by converter 52 (FIG. 3, signal 6). Low pass filtering and video processing by circuit 54 results in a representation of the input video signal (FIG. 3, signal 7). DC restoration and AGC by circuits 56 and 58 produce a video output signal at output 64. AGC circuit 58 is a closed loop system for purposes of precision. This AGC also compensates for gain changes due to temperature drifts in addition to relative phase shifts between the two RF transformers 42 and 44.

The system of FIGS. 2A and 2B can also handle non-composite video which is generated by medical imaging modalities with separate clock and sync signals. These are combined by circuit 30 to generate a composite sync and processed as above. The external clock signal received at input 28 is processed by circuit 40, separately transmitted over isolating RF transformer 46, post processed by circuit 50, and output at output 66.

FIG. 4 shows AGC circuit 34 in greater detail. Circuit 34 includes voltage to gain converter 70, negative peak detector 72, and level offset 74.

FIG. 5 shows AGC circuit 58 in greater detail. Circuit 58 includes voltage to gain converter 80, sync level comparator 82, one shot multivibrator 84, and pulse to voltage converter 86.

The invention has been described in detail with particular reference to certain preferred embodiments thereof, but it will be understood that variations and modifications can be effected within the spirit and scope of the invention.

PARTS LIST 10 system
12 video image source
14 isolation circuit
16 video image utilization device
18 input section
20 output section
22 isolation section
24 input
26 input
28 input
30 external composite sync processing circuit
31 external sync enable
32 video DC clamp preprocessing circuit
34 negative peak controlled video automatic gain control circuit
36 300 Mhz RF clock circuit
38 500 Mhz multiplier circuit
40 external pixel clock preprocessing circuit
42,44,46 isolation RF transformers
48 500 Mhz multiplier circuit
50 external pixel clock post processing circuit
52 150 Mhz current-to-voltage converter
54 low pass filtering and processing circuit
56 video DC restore circuit
58 sync tip tracking close loop video automatic gain control circuit
60 video cable compensation amplifier
62,64,66 outputs
70 voltage to gain converter
72 negative peak detector
74 level offset
80 voltage to gain converter
82 sync level comparator
84 one shot multivibrator
86 pulse to voltage converter

What is claimed is:

1. A high frequency video isolation circuit comprising:
a modulating signal source for producing a modulating signal having a frequency of several hundred megahertz;
an input multiplier for multiplying said modulating signal with an input video signal having frequency components in a frequency range from about several hertz to about one hundred or more megahertz, to produce a modulated video signal having frequency components in a frequency range from about one hundred megahertz to about several hundred megahertz;
a first isolation transformer having an input and an output, for transforming said modulated video signal from said input to said output;
an output multiplier for multiplying said transformed modulated video signal with said modulating signal to produce an isolated output video signal having said frequency components of said input video signal; and
including a second isolation transformer for transforming said modulating signal so as to apply said modulating signal to said output multiplier.

2. A high frequency video isolation circuit comprising:
a modulating signal source for producing a modulating signal having a frequency of several hundred megahertz;
an input multiplier for multiplying said modulating signal with an input video signal having frequency components in a frequency range from about several hertz to about one hundred or more megahertz, to produce a modulated video signal having frequency components in a frequency range from about one hundred megahertz to about several hundred megahertz;
a first isolation transformer having an input and an output, for transforming said modulated video signal from said input to said output;
an output multiplier for multiplying said transformed modulated video signal with said modulating signal to produce an isolated output video signal having said frequency components of said input video signal; and
including an input for an external modulating signal and a third isolation transformer for transforming said external modulating signal from said input to an output.

3. A high frequency video isolation circuit comprising:
a modulating signal source for producing a modulating signal having a frequency of several hundred megahertz;
an input multiplier for multiplying said modulating signal with an input video signal having frequency components in a frequency range from about several hertz to about one hundred or more megahertz, to produce a modulated video signal having frequency components in a frequency range from about one hundred megahertz to about several hundred megahertz;
a first isolation transformer having an input and an output, for transforming said modulated video signal from said input to said output; and an output multiplier for multiplying said transformed modulated video signal with said modulating signal to produce an isolated output video signal having said frequency components of said input video signal; and including an input for inputting said input video signal and a negative peak controlled automatic gain control circuit for controlling the gain of said input video signal.

4. A high frequency video isolation circuit comprising:

a modulating signal source for producing a modulating signal having a frequency of several hundred megahertz;

an input multiplier for multiplying said modulating signal with an input video signal having frequency components in a frequency range from about several hertz to about one hundred or more megahertz, to produce a modulated video signal having frequency components in a frequency range from about one hundred megahertz to about several hundred megahertz;

a first isolation transformer having an input and an output, for transforming said modulated video signal from said input to said output; and an output multiplier for multiplying said transformed modulated video signal with said modulating signal to produce an isolated output video signal having said frequency components of said input video signal; and including a sync tip tracking closed loop automatic gain control circuit for controlling the gain of said output video signal.

* * * * *